(12) United States Patent
Yu

(10) Patent No.: US 7,066,543 B2
(45) Date of Patent: Jun. 27, 2006

(54) POWERED FOLD-FLAT SEAT HINGE ASSEMBLY

(75) Inventor: Shihong Yu, Troy, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/755,515

(22) Filed: Jan. 5, 2001

(65) Prior Publication Data

US 2002/0089223 A1 Jul. 11, 2002

(51) Int. Cl.
*B60N 2/225* (2006.01)

(52) U.S. Cl. .................. 297/378.12; 297/362

(58) Field of Classification Search ........... 297/362.11, 297/361.1, 362, 354.12, 354.1, 353, 378.1, 297/378.12, 367
See application file for complete search history.

(56) References Cited

U.S. PATENT DOCUMENTS

| | | | | |
|---|---|---|---|---|
| 3,700,281 A | * | 10/1972 | Servadio ................ 297/486 |
| 3,890,000 A | * | 6/1975 | Easley | |
| 3,930,551 A | * | 1/1976 | Cragg | |
| 4,077,483 A | * | 3/1978 | Randolph ............... 180/6.5 |
| 4,113,308 A | * | 9/1978 | Werner et al. | |
| 4,402,547 A | * | 9/1983 | Weston et al. ............. 297/379 |
| 4,709,899 A | * | 12/1987 | Kajioka et al. ............. 249/20 |
| 5,435,624 A | * | 7/1995 | Bray et al. ............. 297/362.11 |
| 5,558,403 A | * | 9/1996 | Hammoud et al. ..... 297/378.12 |
| 5,609,348 A | * | 3/1997 | Galumbeck ............. 280/250.1 |
| 5,690,386 A | * | 11/1997 | Chabanne ................ 297/367 |
| 5,788,330 A | * | 8/1998 | Ryan .................. 297/378.12 |
| 5,813,725 A | * | 9/1998 | Robinson ................ 297/367 |
| 5,984,791 A | * | 11/1999 | Fair et al. ................. 472/118 |
| 6,000,757 A | * | 12/1999 | Sovis ................... 297/344.1 |
| 6,101,961 A | * | 8/2000 | Sakuma ................. 112/255 |
| 6,428,104 B1 | * | 8/2002 | Sakamoto et al. ..... 297/362.11 |

* cited by examiner

Primary Examiner—Peter R. Brown
(74) Attorney, Agent, or Firm—Harness, Dickey & Pierce, P.L.C.

(57) ABSTRACT

A fold-flat hinge assembly for use with a seat assembly includes an arm pivotably supported by a support member and adapted to support the seat back, as well as a gear fixedly attached to a shaft that is rotatably supported within a first slot of the support member. The shaft also includes a gear fixedly attached thereto and interfacing said arm. A blocking pin slidably supported by the support member between a first position and a second position and mechanically communicating with the shaft blocks rotation of the arm relative to the support member when in a first position. When the blocking pin is moved to a second position by the shaft interacting with the gear teeth of the arm, the arm is in rotate relative to the support member.

21 Claims, 6 Drawing Sheets

POWERED FOLD-FLAT SEAT HINGE ASSEMBLY

BACKGROUND OF THE INVENTION

1. Technical Field

The present invention relates generally to seat hinge assemblies and more particularly to a powered fold-flat seat hinge assembly.

2. Discussion

Vehicle markets such as mini-van and sport utility are extremely competitive and a focus for improvement by automobile manufacturers. Specifically, automobile manufacturers seek to improve the overall utility and comfort of the vehicles in these markets in pursuit of attracting and keeping customers. One particular concern of customers is the flexibility a vehicle interior maintains. Flexibility, in this sense, refers to the ability of an interior to provide seating that may be modified to suit a particular customer's needs. For example, a customer might desire the removal of a rear seat to provide increased cargo space, while maintaining a middle seat or seats for additional passengers. Additionally, a passenger might desire the seat back of a front or middle seat to fold down, providing room for cargo.

While providing flexibility seats must also include features for improving occupant ease of use while maintaining safety standards. A particular ease of use feature is the mechanism by which a seat back folds forward relative to a seat. Traditional fold-forward mechanisms include manual latches that release the seat back, enabling an occupant to manually fold the seat back forward. Typically, the seat back folds flat, relative to the seat, and is held in position by the weight of the seat back itself. Further, traditional fold-forward mechanisms only provide a single fold-forward position for the seat back. Additionally, due to the manual nature of traditional fold-forward mechanisms, a vehicle occupant must have direct access to the seat back in order to operate the mechanism. For example, if a driver desired a rear seat to be folded forward, she must exit the vehicle and walk to the desired seat in order to operate the mechanism. Where powered seat hinge assemblies are provided, a first motor unlatches the arm and a second motor rotates the arm forward. This can be a prohibitively expensive and complex arrangement.

It is therefore desirable in the industry to provide a fold-forward mechanism for use with a seat having a seat back that is powered, increasing the ease of use for a vehicle occupant. As such, a powered fold-forward mechanism enables an occupant to remotely fold a seat back forward without having to exit the vehicle and perform the operation manually. Further, it is desired to power the latching and rotation through a single motor.

It is further desirable in the industry to provide a fold-forward mechanism for use with a seat back that enables an occupant to lock the seat back in a desired fold forward position. As such, a seat back could be folded forward while providing sufficient angle to prevent an object from sliding during braking or acceleration.

SUMMARY OF THE INVENTION

The present invention provides a powered fold-forward mechanism for folding a seat back relative to a seat. The present invention also enables an occupant to select a desired fold-forward position for a seat back relative to a seat. Advantageously, a single motor unlatches and rotates the seat back in a cost-effective and compact assembly.

A fold-forward mechanism according to the invention includes a support member and an arm pivotally supported by the support member. The arm includes a face having a plurality of gear teeth formed thereon. The support member includes a first slot rotatably supporting a gear that interfaces with the gear teeth on the arm. A blocking pin is slidably supported within a second slot of the support member and is in mechanical communication with the shaft. In a first position within the second slot, the blocking pin prevents forward rotational motion of the arm relative to the support member. The shaft is rotatable within and slidable along the first slot to enable the blocking pin to move to a second position within the second slot, in which such position the arm is free to rotate in a forward direction relative to the support member.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
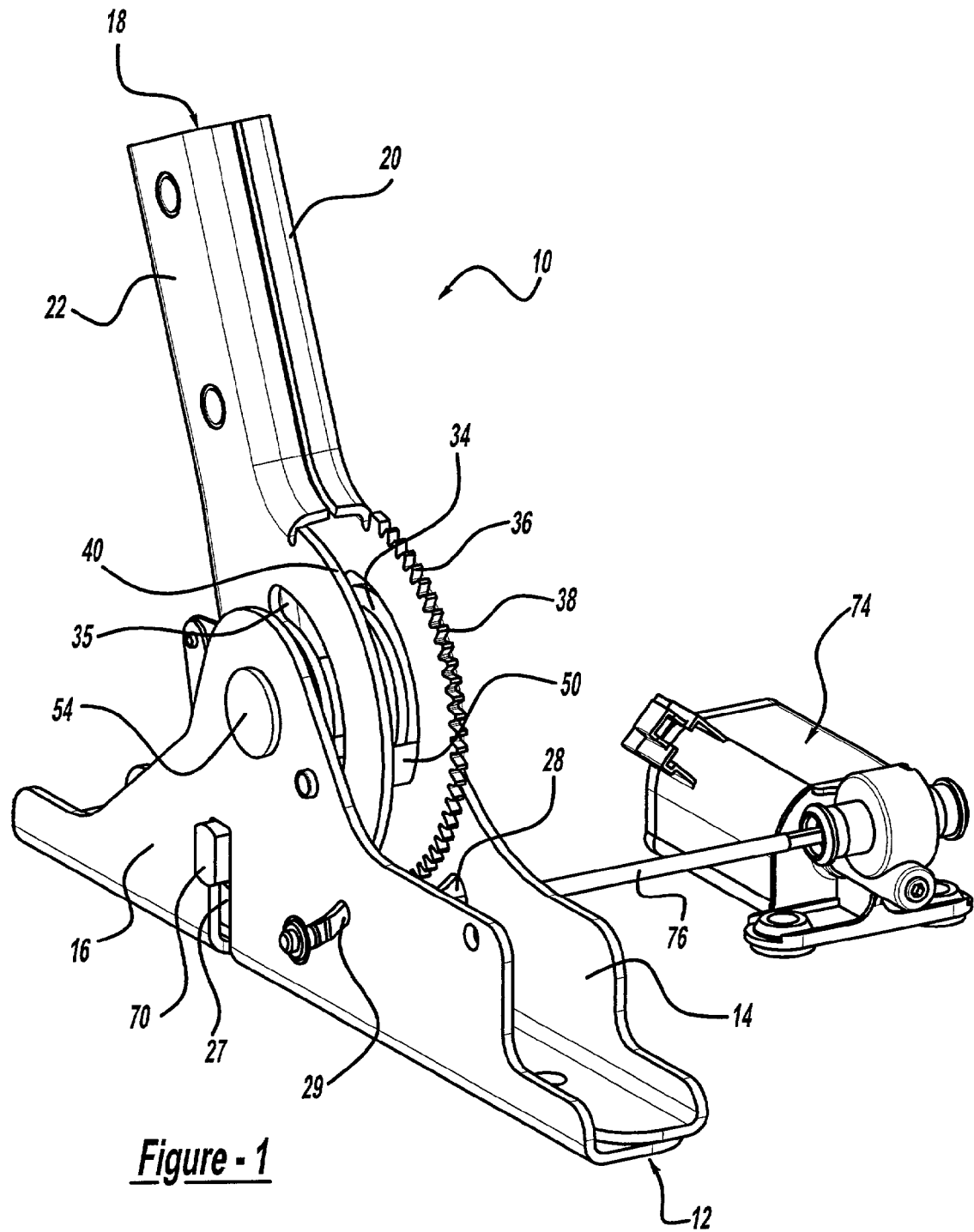
FIG. 1 is a perspective view of a first preferred embodiment of a fold-flat mechanism of the present invention.
Figure 3:
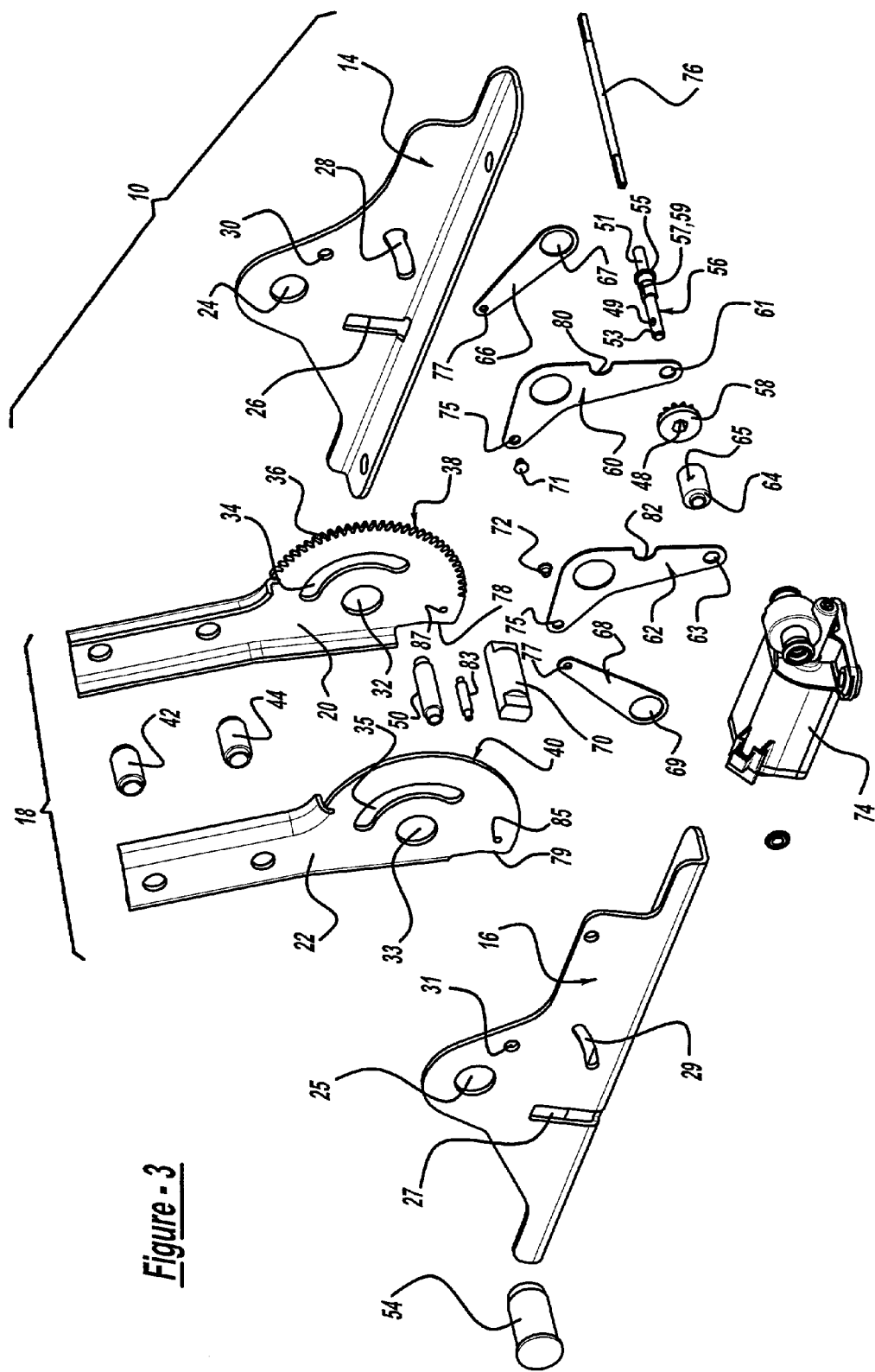
FIG. 3 is an exploded view of the fold-flat mechanism of FIG. 1.

With particular reference to FIGS. 1 and 3 a fold-flat seat hinge assembly 10, preferably for use with a seat assembly, is shown. The fold-flat seat hinge assembly 10 includes a support bracket 12 having inner and outer brackets 14,16. The support bracket 12 rotatably supports a quadrant 18 that includes inner and outer quadrant halves 20,22.

The inner and outer brackets 14,16 each include a mounting hole 24,25, a sliding pin slot 26,27, a pinion slot 28,29, and a stop pin hole 30,31 respectively. The inner and outer brackets 14,16 are disposed on opposing sides of the quadrant 18 and a main pivot 54 is disposed through the mounting holes 24,25. The main pivot 54 initially runs through the mounting hole 25 of the outer bracket 16, and further through the main pivot holes 32,33 of the inner and outer quadrant halves 20,22, and finally through the mounting hole 24 of the inner bracket 14. As such, the quadrant 18 is rotatably supported between the inner and outer brackets 14,16 on the main pivot 54.

The inner and outer quadrant halves 20,22 each include a main pivot hole 32,33 and a pin slot 34,35 respectively. The inner quadrant half 20 further includes a gear teeth portion 36 running along an arcuate edge 38. The arcuate edge 38 runs along a constant radius from the center point of the main pivot hole 32. The outer quadrant half 22 also includes an arcuate edge 40 having the same radius as the arcuate edge 38 of the inner quadrant half 20. The arcuate edge 40 of the outer quadrant half 20 is equivalent in height to the gear teeth portion 36 of the inner quadrant half 20. First and second spacers 42,44 are included between the inner and outer quadrant halves 20,22 for properly spacing and aligning the inner and outer quadrant halves 20,22. A rivet pin 83 links inner and outer quadrant halves 20,22 through apertures 85,87, respectively. Preferably, the rivet pin 83 is staked to inner and outer quadrant halves 20,22. The pin slots 34,35 of the inner and outer quadrant halves 20,22, respectively, are arcuate in form along a radius extending from the center of the main pivot hole 32,33. As such, the arcuate edges 38, 40 are concentric about the pin slots 34,35, respectively. Disposed within and running through the pin slots 34,35 is a stop pin 50, which is supported between the inner and outer brackets 14,16 by the stop pin holes 30, 31. As the quadrant 18 rotates about the main pivot 54, the stop pin 50 runs within the pin slots 34,35 of the inner and outer quadrant halves 20,22. A range for rotational movement of the quadrant 18 relative to the bracket 12 is established by the arcuate range of the stop pin 50 within the pin slots 34,35.

A pinion shaft 56 is disposed between the inner and outer brackets 14,16 and runs through the pinion slots 28,29 of the inner and outer brackets 14,16, respectively. The pinion slots 28,29 are arcuate in form sharing a common radial center point as the arcuate edges 38,40 and the pin slots 34,35 of the inner and outer quadrant halves 20,22. As such, the pinion slots 28,29 are concentric about both the arcuate edges 38,40 and the pin slots 34,35. The pinion shaft 56 is also rotatably supported through the holes 61, 63 of the first and second lever arms 60,62, respectively.

Figure 2:
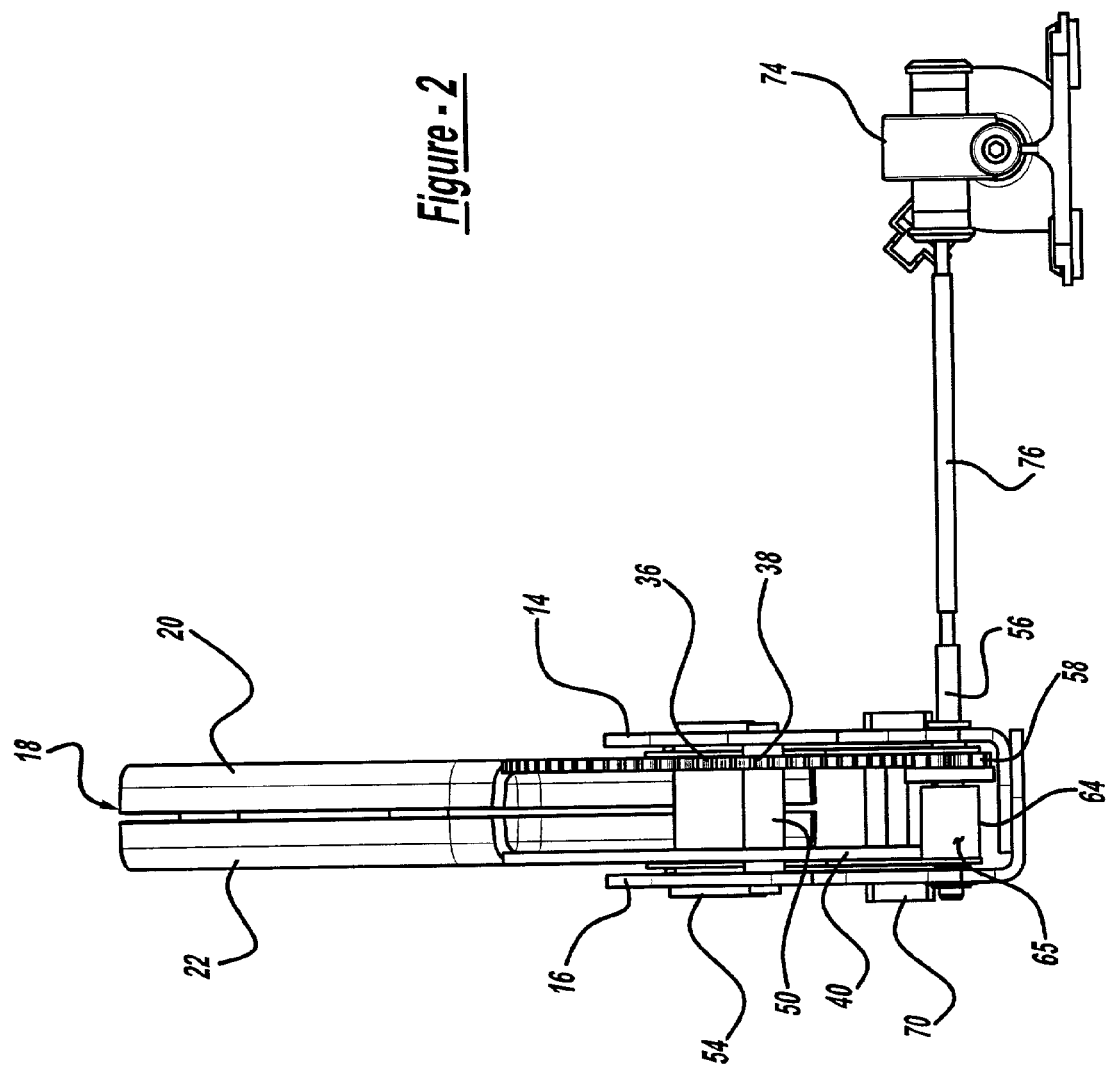
FIG. 2 is a front view of the fold-flat mechanism of FIG. 1.

The pinion shaft 56 includes first and second cylindrical extensions 53,55, first and second key surfaces 57,59 disposed therebetween and a radially extending collar 51. The first cylindrical extension includes a bearing surface 49. A pinion gear 58 is supported by and fixed for rotation with the pinion shaft 56 and meshes with the gear teeth portion 36 of the inner quadrant half 20. The pinion shaft 56 is received through a centrally disposed aperture 48 of the pinion gear 58, wherein the key surfaces 57,59 interface with corresponding key surfaces of the aperture 48. The collar 51 prohibits the pinion shaft 56 from sliding completely through the aperture 48, thus retaining the pinion gear 58 on the pinion shaft 56. A shaft sleeve 64 is included and is rotatably supported by the pinion shaft 56 on the bearing surface 49 of the first cylindrical extension 53. The outside surface 65 of the shaft sleeve 64 contacts and slidably supports the arcuate edge 40 of the outer quadrant half 22 (see FIG. 2). The first and second lever arms 60,62 are disposed on either side of the inner and outer quadrant halves 20,22, respectively, and are rotatably supported by the main pivot 54. As such, the first and second lever arms 60,62 are concentrically aligned and rotatable about the same pivot point as the quadrant 18.

First and second link arms 66,68 link the first and second lever arms 60,62 with a sliding pin 70. A first end of each of the first and second link arms 66,68 is rotatably attached to second ends of the first and second lever arms 60,62 via first and second link rivets 71,72, each of which is disposed through a pair of aligned apertures 75,77 of the first and second lever arms 60,62 and the first and second line arms 66,68, respectively. A second end of each of the first and second link arms 66,68 is rotatably attached to the sliding pin 70 via holes 67, 69, respectively. The sliding pin 70 is disposed between the inner and outer brackets 14,16 and runs along vertical sliding pin slots 26,27.

In a first preferred embodiment, the fold-flat seat hinge assembly 10 is operated by an electric motor 74. A cable shaft 76 is a flexible shaft operably connected at a first end to an end of the second cylindrical extension 55 of the pinion shaft 56 and to the electric motor 74 at a second end. A flexible cable shaft 76 allows the ends of the shaft 76 to be misaligned or slid in slots 28,29 of the inner and outer brackets 14,16 while rotating the pinion shaft 56. The electric motor 74 selectively rotates the cable shaft 76, which in turn rotates the pinion shaft 56. The electric motor 74 is selectively operable in forward, reverse, and stop modes by an operator through a switch (not shown). Additionally, an electric power source (not shown), such as a battery, is included to power the electric motor 74.

Figure 4:
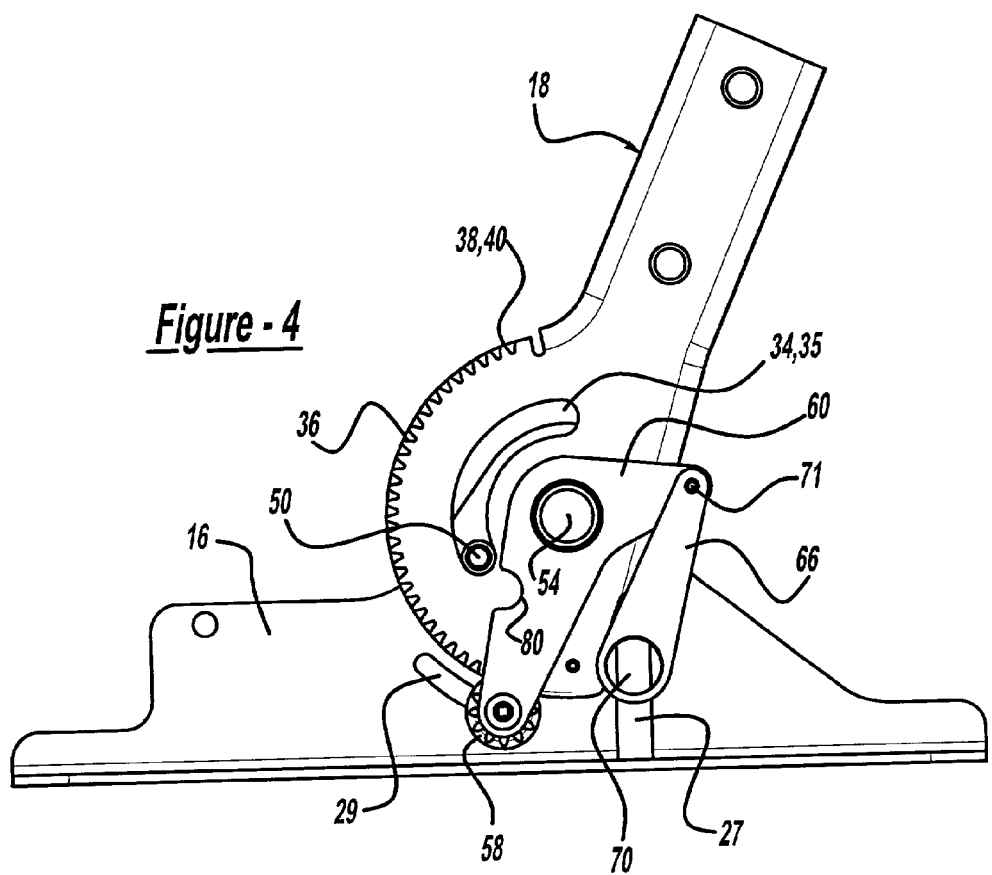
FIG. 4 is a side view of the fold-flat mechanism of FIG. 1 in an upright position.
Figure 5:
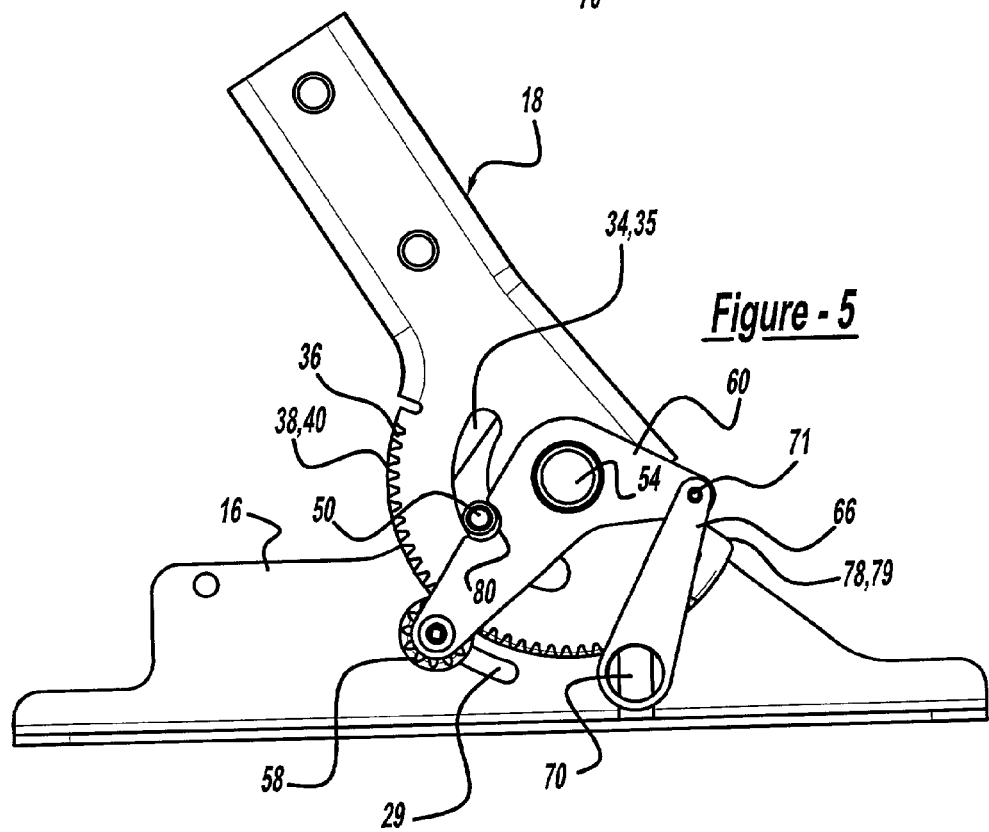
FIG. 5 is a side view of the fold-flat mechanism in a partial forward-folded position.
Figure 6:
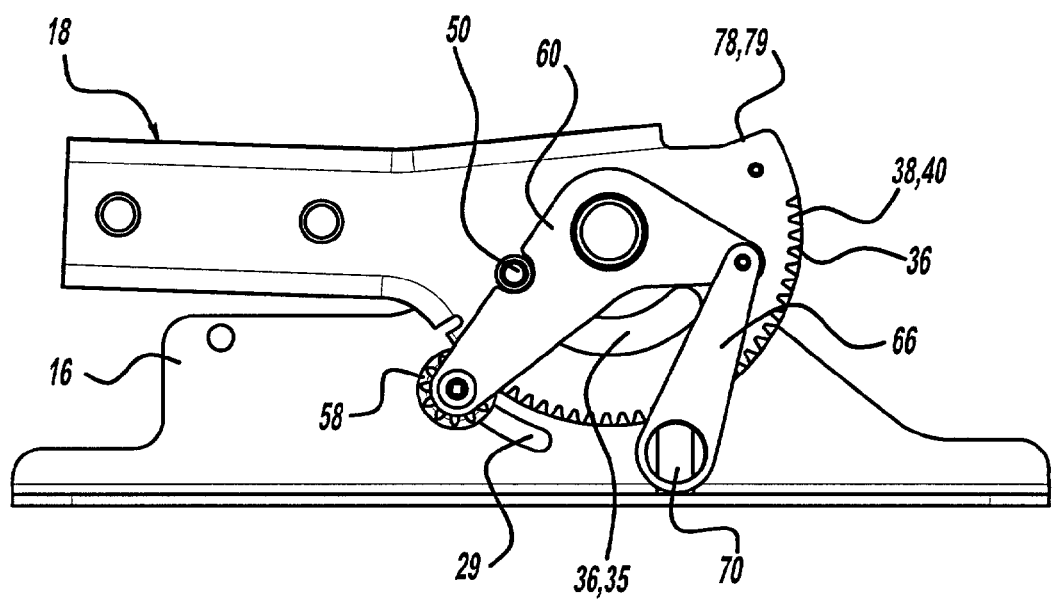
FIG. 6 is a side view of the fold-flat mechanism of FIG. 1 in a full-forward position.

With particular reference to FIGS. 4 through 6, operation of fold-flat seat hinge assembly 10 will be described in detail. It should be first noted however, that FIGS. 4 through 6 are side views of the fold-flat seat hinge assembly 10 with the inner bracket 14 removed for clarity. Initially, as shown in FIG. 4, the quadrant 18 is in a first upright position relative to the outer bracket 16. The sliding pin 70 is located in a first position at the upper most point of the sliding pin slots 26,27. In this position, the sliding pin 70 prevents forward rotation of the quadrant 18 relative to the bracket 12 by blocking the stop faces 78,79 of the inner and outer quadrant halves 20,22. In the initial position, the pinion shaft 56 and the pinion gear 58 are positioned at the lowest end of the pinion slots 28,29 and the stop pin 50 is located at the lowest point of the pin slots 34,35.

A fold-forward process is initiated by triggering the switch to operate the electric motor 74 in the forward mode. The electric motor 74 rotates the cable shaft 76, further rotating the pinion shaft 56 and the pinion gear 58. Because the quadrant 18 is prevented from forward rotation by the sliding pin 70 the pinion gear 58 rotates along the gear teeth portion 36 of the inner quadrant 20. The pinion gear 58 and the pinion shaft 56 slide toward an upper portion of the pinion slots 28,29. As a result, the first and second lever arms 60,62 begin to rotate upwards with the pinion gear 58 and the pinion shaft 56. As the first and second lever arms 60,62 rotate upward, the first and second link arms 66,68 are pushed downward thus pushing the sliding pin 70 in a downward direction within the sliding pin slots 26,27.

As best seen in FIG. 5, once the pinion shaft 56 and the pinion gear 58 have reached the upper portion of the pinion slots, 28,29, the sliding pin 70 is sufficiently below stop faces 78,79 wherein the quadrant 18 is free to rotate in a forward direction. Continued rotation of the pinion gear 58 by the electric motor 74 causes the quadrant 18 to rotate forward until a fold-flat position has been achieved. This is best seen in FIG. 6. Once the fold-flat position has been achieved, the stop pin 50 is positioned at an upper portion of the pin slots 34,35. Also, the stop pin 50 is located within the recesses 80,82 of the first and second lever arms 60,62, respectively. It should also be noted that the electric motor 74 could be switched to a stop mode during the fold-flat process, holding the seat back at a desired angle relative to the seat.

In a reverse mode, the electric motor 74 drives the pinion shaft 56 and the pinion gear 58 in a reverse direction. Initially, the arcuate edges 38,40 of the quadrant 18 slidably contact the sliding pin 70, thus prohibiting upward movement of the sliding pin 70. As a result, the pinion shaft 56 and the pinion gear 58 remain positioned in the upper portion of the pinion slots 28,29 until the pinion gear 58 has rotated the quadrant 18 sufficiently, wherein arcuate edges 38,40 no longer block upward movement of the sliding pin 70. Due to the continued rotation of the pinion gear 58 on the gear teeth portion 36 of the inner quadrant half 14, the pinion gear 58 and the pinion shaft 56 slide downward toward a lower portion of the pinion slots 28,29. As this occurs, the first and second lever arms 60,62 rotate downward, thus pulling the first and second link arms 66,68 upward. As the first and second link arms 66,68 are drawn upward, the sliding pin 70 travels upward within the sliding pin slots 26,27. The electric motor 74 and the pinion gear 58 continue to drive the quadrant 18 to its initial upright position until the stop pin 50 prevents further rotation of the quadrant 18. This is achieved by the stop pin 50 contacting the lower portion of the pin slots 34,35.

Figure 7:
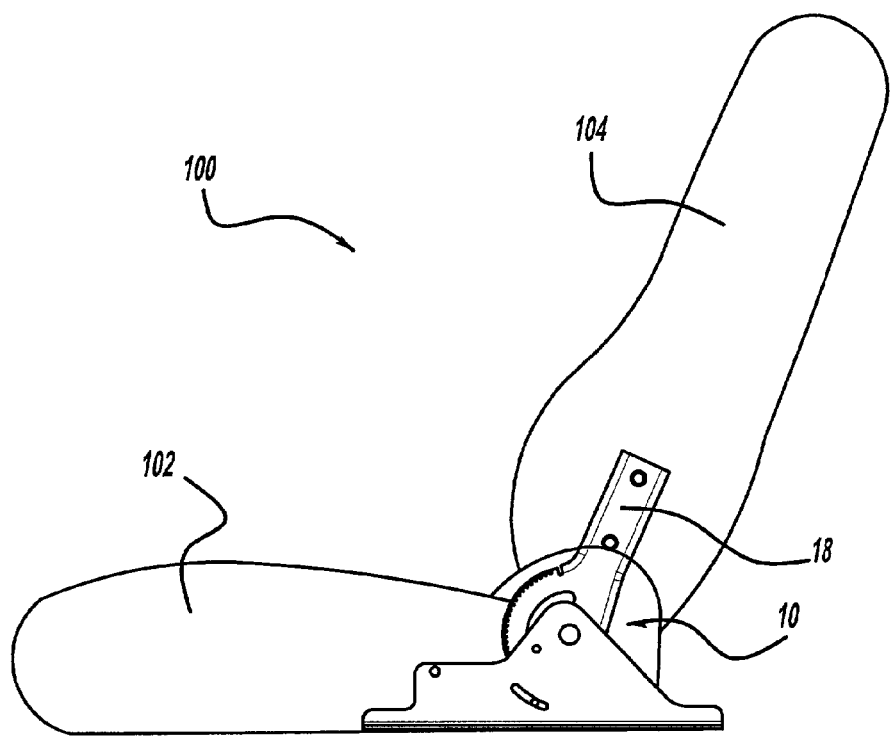
FIG. 7 is a schematic view of a seat assembly implementing the fold-flat mechanism of the present invention.

With particular reference to FIG. 7, a seat assembly 100 is shown implementing the fold-flat seat hinge assembly 10. The seat assembly 100 includes a seat 102 and seat back 104. The seat back 104 is attached to and supported by the quadrant 18 and is pivotally adjustable relative to the seat 102 by the fold-flat seat hinge assembly 10. The seat back 104 pivots with the quadrant 18 as the quadrant 18 is caused to pivot as described above. However, it is important to note that while the seat back 104 is located in an upright position relative to the seat 102, forward pivoting of the quadrant 18 is prohibited by the sliding pin 70. In this manner, occupant safety is increased as the quadrant 18, and therefore seat back 104, are prohibited from unintentional forward pivoting (e.g., in the event of an accident).

Figure 8:
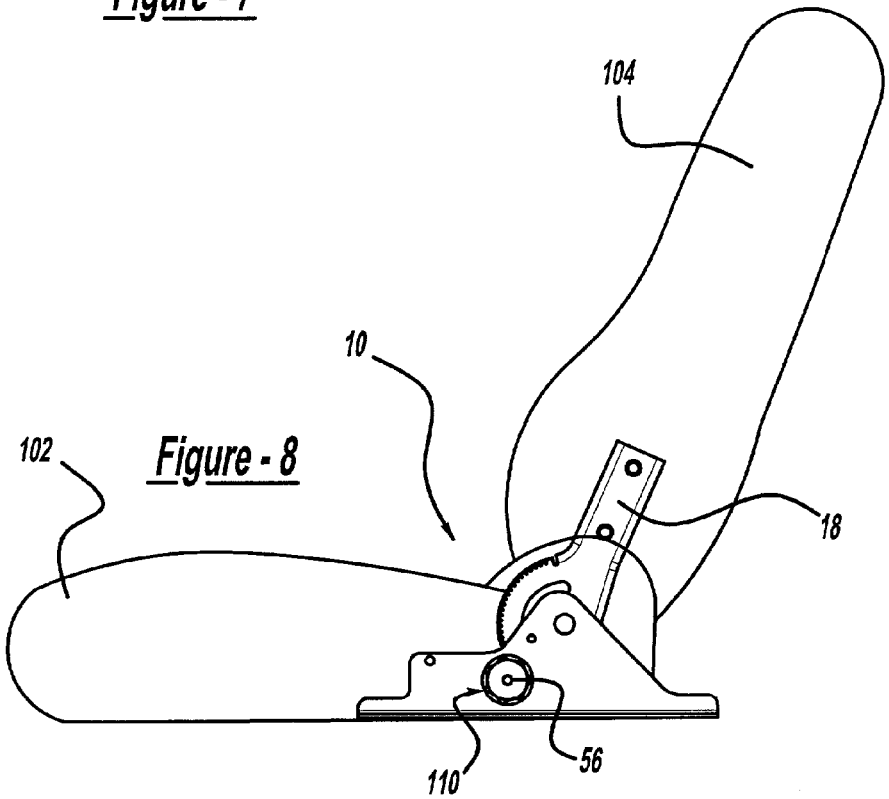
FIG. 8 is a perspective view of a second preferred embodiment of a fold-flat mechanism of the present invention.

It is also foreseen that the fold-flat seat hinge assembly 10 may be manually operated. With reference to FIG. 8, a second preferred embodiment of the fold-flat seat assembly 10 includes a dial 110 for manually rotating the pinion shaft 56 and the pinion gear 58. The dial 110 is fixedly attached to the second end of the pinion shaft 56. The second preferred embodiment is similar in operation as the first preferred embodiment described above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seat hinge assembly, comprising:
   a support including a first slot;
   an arm pivotally mounted to said support;
   a sliding pin operable to prevent movement of said arm relative to said support in a locking position; and
   a drive shaft operable to rotate from a first position and slide along said first slot to move said sliding pin from said locking position without moving said arm relative said support, and operable in a second position to move said arm relative said support.

2. The seat hinge assembly according to claim 1, further comprising at least one lever arm pivotally attached to said support at a pivot point and wherein said lever arm rotatably supports said drive shaft at a first end and a link arm at a second end, said link arm further connecting to said sliding pin.

3. The seat hinge assembly according to claim 1, further comprising a second slot formed in said arm and a stop pin attached to said support, said slot slidably interfacing said stop pin for defining a rotational range of motion of said arm relative to said support.

4. The seat hinge assembly according to claim 1, further comprising a gear on said drive shaft and gear teeth on said arm, wherein said drive shaft is operable to move from said first position to said second position in response to said gear interacting with said gear teeth.

5. The seat hinge assembly according to claim 4, wherein said arm is operable to rotate relative to said support when said drive shaft is in said second position.

6. The seat hinge assembly according to claim 1, further comprising a motor operable to rotate said drive shaft.

7. The seat hinge assembly according to claim 6, wherein said motor is operable in a forward mode, a reverse mode and a stop mode.

8. The seat hinge assembly according to claim 1, further comprising a dial operable to manually rotate said drive shaft.

9. A hinge assembly for use with a seat and seat back, said hinge assembly, comprising:
   a support including an elongated slot therein;
   an arm supported by said support and adapted to support the seat back;
   a sliding pin movable between a first position and a second position relative said support, said sliding pin preventing rotation of said arm relative to said support in said first position and allowing said arm to rotate relative to said support in said second position; and
   a shaft disposed within said elongated slot of said support and operable to interface said arm as said shaft slides in said elongated slot to move said sliding pin from said first position to said second position before driving said arm to move relative said support.

10. The hinge assembly according to claim 9, further comprising a motor operable to rotate said shaft.

11. The hinge assembly according to claim 10, wherein said motor is operable in a forward mode, a reverse mode and a stop mode.

12. The hinge assembly according to claim 9, wherein said arm includes a plurality of gear teeth, said shaft includes a gear, and said sliding pin is moved to said second position by said gear interacting with said gear teeth.

13. The hinge assembly according to claim 9, further comprising at least one lever arm pivotally attached to said support at a pivot point and wherein said lever arm rotatably supports said shaft at a first end and a link arm at a second end, said link arm further connecting to said sliding pin.

14. The hinge assembly according to claim 9, further comprising an arcuate slot formed in said arm and a stop pin attached to said support, said arcuate slot slidably interfacing said stop pin to define a range of motion of said arm relative to said support.

15. The hinge assembly according to claim 9, wherein said shaft is slidably supported in said elongated slot by said support to define a locking position and an actuation position, said shaft sliding in said elongated slot in response to a gear on said drive shaft interacting with gear teeth on said arm to move said sliding pin to said second position.

16. The hinge assembly according to claim 15, wherein said arm is able to rotate relative to said support when said shaft is in said actuation position.

17. A seat assembly, comprising:
   a seat;
   a seat back connected to said seat;

a hinge assembly, including:
  a support including a first slot;
  an arm pivotally mounted to said support;
  a sliding pin operable to prevent movement of said arm relative to said support in a locking position; and
  a drive shaft operable to rotate from a first position and slide along said first slot to move said sliding pin from said locking position without moving said arm relative said support, and operable in said second position to move said arm relative said support.

18. The seat assembly according to claim 17, further comprising at least one lever arm pivotally attached to said support at a pivot point and wherein said lever arm rotatably supports said drive shaft at a first end and a link arm at a second end, said link arm further connecting to said sliding pin.

19. The seat assembly according to claim 17, further comprising a second slot formed in said arm and a stop pin attached to said support, said slot slidably interfacing said stop pin for defining a rotational range of motion of said arm relative to said support.

20. The seat assembly according to claim 17, further comprising a gear on said drive shaft and gear teeth on said arm, wherein said drive shaft is operable to move said first position to said second position in response to said gear interacting with said gear teeth.

21. The seat assembly according to claim 20, wherein said arm is operable to rotate relative to said support when said drive shaft is in said second position.

* * * * *